United States Patent [19]

Kimura et al.

[11] 4,144,537

[45] Mar. 13, 1979

[54] METHOD AND APPARATUS FOR CAPPING A NOZZLE OF INK JET RECORDING DEVICE

[75] Inventors: Yoshiaki Kimura; Yoshio Takeuchi; Mikio Yamada, all of Hachioji; Taneji Morishita, Hino; Tatsuo Yajima, Kowagoe, all of Japan

[73] Assignee: Konishiroku Photo Industry Co., Ltd., Tokyo, Japan

[21] Appl. No.: 802,676

[22] Filed: Jun. 2, 1977

[30] Foreign Application Priority Data

Jun. 7, 1976 [JP] Japan .......... 51-66893

[51] Int. Cl.[2] .......... G01D 15/18

[52] U.S. Cl. .......... 346/140 R

[58] Field of Search .......... 346/140 R, 75

[56] References Cited

U.S. PATENT DOCUMENTS

| | | | |
|---|---|---|---|
| 3,346,869 | 10/1967 | Stone | 346/75 |
| 3,945,020 | 3/1976 | Kraus | 346/75 |
| 4,045,802 | 8/1977 | Fukazawa | 346/75 X |

FOREIGN PATENT DOCUMENTS

| | | | |
|---|---|---|---|
| 2362576 | 2/1975 | Fed. Rep. of Germany. | |
| 2519160 | 9/1976 | Fed. Rep. of Germany | 346/140 R |

*Primary Examiner*—Joseph W. Hartary

*Attorney, Agent, or Firm*—Limbach, Limbach & Sutton

[57] ABSTRACT

A method and apparatus for capping the nozzle of a print head of an ink jet recording device for ejecting ink droplets upon a recording medium which comprises capping means which covers the nozzle of the print head of the ink jet recording device for preventing dust from adhering to the nozzle and for eliminating bubbles from getting into the nozzle to prevent the recording ink in the print head from evaporating in combination with purging means composed essentially of suction tube for purging the nozzle of the print head, and which method comprises installing the capping means at a position outside the area of printing of the recording device, and moving the print head to this position when no recording is performed to cap the nozzle face of the print head.

16 Claims, 8 Drawing Figures

FIG. 3
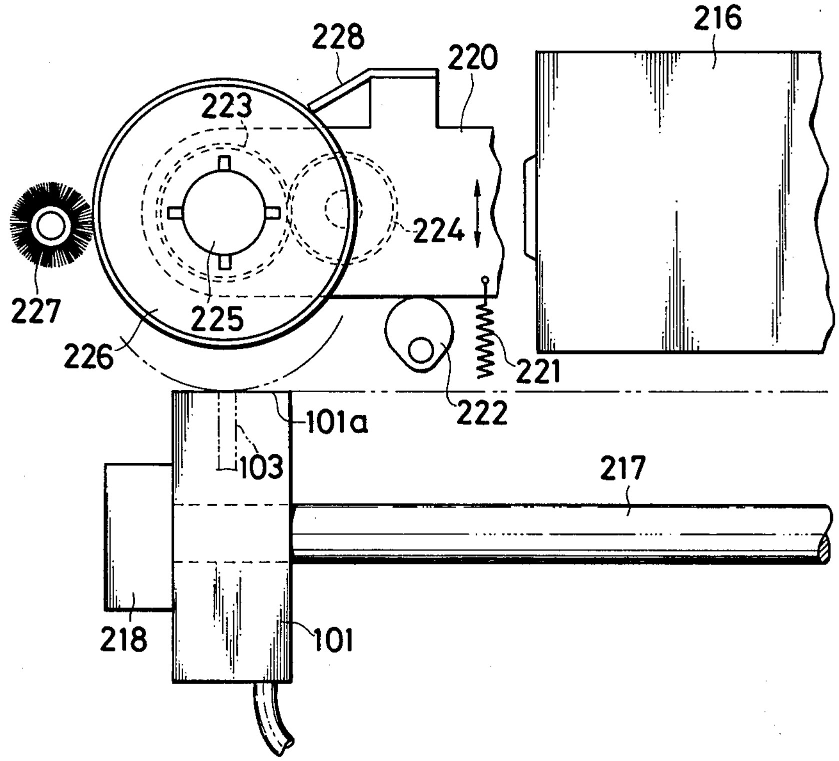
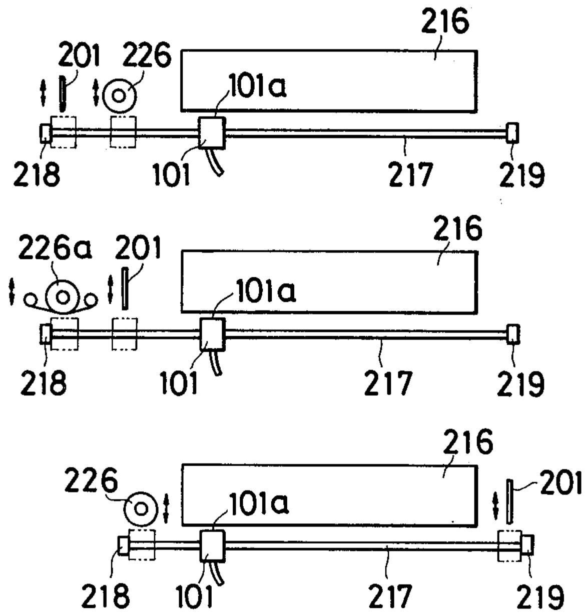
FIG. 4A
FIG. 4B
FIG. 4C

METHOD AND APPARATUS FOR CAPPING A NOZZLE OF INK JET RECORDING DEVICE

BACKGROUND OF THE INVENTION

This invention relates to an ink jet recording, and more particularly to method and apparatus for capping the nozzle of an ink jet recording device to record a desired character or figure on a recording medium upon ejection of recording ink droplets on the medium.

An ink jet printer can generally operate to print on cheap normal paper at high speed with extremely low noise without the necessity of developing and fixing processes and can record figures and chinese characters for practical use as output recording equipment for computers and data communication, etc.

Representative ink jet recording systems will now be described from the prior art for better and easier understanding of the present invention.

One ink jet recording system has a record member arranged opposite to the nozzle of a print head, a charging electrode and a deflection electrode installed between the record member and the print head. In recording operation a pump is, for example, used to impart high pressure to recording ink and the nozzle is vibrated to continuously eject ink droplets from the nozzle in this system, and a video signal responsive to the signal from character generator is applied to the charging electrode to thus charge the ink droplets. Then, ink droplets thus charged are deflected by the deflection electrode to be ejected onto the record member to then record the character or figure thereon.

Another electrostatic inking apparatus has an accelerating electrode for producing ink droplets, a deflection electrode for deflecting the ink droplets thus produced and a shield electrode for shielding the motion of the ejected ink droplets thus deflected from external electric field arranged between print head and record member. Minute pressure is imparted, for example, to recording ink by a pump to form a positive meniscus at the end of the nozzle of print head with recording ink in the nozzle. Then, upon recording operation high voltage is applied to the nozzle of the print head so that recording ink is ejected as droplets from the nozzle by strong electric field formed to the accelerating electrode to thus deflect the ejected droplets suitably by the deflection electrode upon reception of signal from a character generator and to then pass the droplets via the shield electrode onto the record member.

Further ink jet recording system employs a piezoelectric converter for imparting impulse wave to a triangular nozzle to continuously eject recording ink droplets from the nozzle outlet by the strength of the impulse wave increased while moving from the big end toward small end of the triangular nozzle to thus form a desired pattern on the record member arranged opposite to the nozzle of the print head.

Still another ink jet recording system operates to rapidly reduce the volume of fluid chamber within a print head provided for storing recording ink therein upon reception of a control signal to impart the kinetic energy produced by this sudden decrease in volume of the chamber to recording ink to thus eject recording ink droplets from the nozzle provided at the print head upon a record member to form desired pattern on the member.

With respect to the ink jet recording system of the above volume change type of a fluid or pressure chamber formed within the print head to eject a recording ink droplet, the following difficulties are raised in practical use around the nozzle portion of the print head:

First, the nozzle of the print head is easily blocked by dried ink in the nozzle and non-use for a period deteriorates the ejecting function of the nozzle of the print head.

Second, dust tends to adhere to the nozzle face of the print head due to moisture of fluid ink around the nozzle.

Third, recording ink is leaked from the nozzle and bubbles and dust are taken into the nozzle of the print head as the result of external causes such as shock, vibration imparted to the print head and environmental change such as temperature, moisture, etc. occurring around the head.

More particularly, if dust adheres to the nozzle outlet or opening of print head, ejected recording ink is partly collided with the dust with the result that the ejected recording ink droplets cannot keep a predetermined constant amount to be maintained. As a result, a dot or the like is formed at an unexpected portion on the recording medium to deteriorate the recording quality on the medium due to the lack of rectilinear advancement of ejected recording ink from the nozzle of the print head. In addition, ejected ink impinged on such dust that is adhered to the nozzle of the print head tends to moisten the vicinity of the nozzle opening of the print head to contaminate the nozzle face of the head with the ink. This is particularly worse in case, for example, that plural nozzles are provided in one print head (such as, for example, seven nozzles are perforated at one print head to be arranged longitudinally), different from the print head having only one nozzle formed thereat. Other nozzles are also affected badly by the contaminated nozzle due to narrow nozzle intervals on the nozzle face of the print head. In another case, impinged recording ink with dust is solidified on the dust so that the dust adhered with ink is gradually enlarged with subsequent ink with the result that the enlarged lump of ink and dust block the nozzle opening of the print head. Then, no recording ink is ejected from such blocked nozzle of the print head upon the recording medium. Although the nozzle opening of the print head is very small, recording ink has volatility including, for example, ethylene glycol, water and coloring matter as main components. Accordingly, if the recording operation is stopped for a long term, ink gradually evaporates, and in the particular case of a multi-nozzle type print head, the amount of evaporated ink is increased to waste the ink. Further, coloring matter in the nozzle of the print head is solidified to thus produce bubbles following the recording operation. In addition, recording ink tends to be ejected due to external causes such as temperature change, atmospheric pressure change, vibration, shock, etc. so that ink thus ejected badly affects the following recording operation such as by the generation of bubbles in the nozzle of the print head.

SUMMARY OF THE INVENTION

It is a general object of the present invention to provide a novel method and apparatus for capping the nozzle of an ink jet recording device which can eliminate all of the above problems of the conventional ink jet recording system. Namely, the present invention solves the problem of the narrow working distance between the print head and the recording medium by moving the capping means away from the printing operation area, i.e., when printing is not being performed, the print head is moved to a position away from the printing area (off the platen) and the print head is capped at this position. Concerning the problems of the proper maintenance of the conditions of moisture of the print head and the problems of heat, vibration and the like which cause the ink of the head to leak out, a solution has been found by the following advantages:

(a) There should not be any relative slippage between the cap member and the print head nozzle outlet during the capping operation.

(b) The cap member should be pressed against the print head nozzle outlet with appropriate pressure to avoid any flow of ink from the ejection passage of the print head even though heat or vibration is inflicted upon the head.

(c) For each capping operation, that part of the capping member which will come into contact with the print head nozzle inlet should present either a fresh surface or a freshly cleaned surface to the print head nozzle outlet to avoid change in the conditions of moisture of the print head nozzle outlet.

(d) The capping operation should be simple and reliable.

To obtain these advantages, the cap member of the capping means of the present invention is advantageously constructed:

(a) To come in contact with the print head nozzle outlet with a movement which avoids any substantial lateral slippage (for example, movement in a straight line or in a large arc toward the print head nozzle outlet) and, additionally, to press against the print head nozzle outlet with a predetermined pressure.

(b) To separate from the print head nozzle outlet in the same manner as immediately above, (c) To be connected with a coupling mechanism which will unfailingly cause a fresh contact part or a freshly cleaned contact part to face the print head nozzle outlet for each capping operation. For example, capping means can be constructed such that with a movable cylinder (or belt) cap member coupled to an appropriate mechanism that part of the cap member in contact with the print head nozzle outlet shifts with respect to the print head nozzle outlet either before contact is made or upon removal of the cap from the head nozzle outlet. Thus, for the next capping operation there will always be a different part of the contact member opposite the print head nozzle outlet. Alternatively, as in an ordinary typewriter, a ribbon mechanism can be installed in the capping means. Each time a capping operation is made, a fresh part of the ribbon is moved to face the print head nozzle outlet. The ribbon is immediately in front of the print head and a pressure member, which is behind the ribbon and can move back and forth in a direction perpendicular to the print head nozzle outlet, moves downward to press the fresh part of the ribbon against the head nozzle outlet to complete the capping. Naturally, for a capping means with a single piece cap member, there is the necessity for a good cleaning of that part of the cap member in contact with the print head nozzle outlet upon removal of the cap member from the print head nozzle outlet.

It is another object of the present invention to provide a method and apparatus for capping the nozzle of an ink jet recording device which can prevent dust from adhering to the nozzle and which can also exclude generation of bubbles from the nozzle that might occur due to environmental change upon no recording. This object is achieved by an ink jet recording device for recording desired character or figure by abruptly reducing the volume of a pressure chamber containing recording ink within a print head during relative movement with respect to a recording medium, ejecting ink droplet from a nozzle communicating with the chamber by means of kinetic energy generated by the volume change onto the recording medium, which device comprises capping means so arranged that is spaced from the nozzle provided at the end of the print head when the print head is performing a recording operation and that shut off the nozzle outlet in contact with the nozzle after the recording operation is completed so that the print head is stopped at predetermined position.

It is still another object of the present invention to provide an ink jet recording device which prevents the recording ink existing in the print head from evaporating or dust from being adhered to the nozzle by the contacting action of the capping member upon no recording and which can exclude recording ink adhered to the surface of the capping member with flushing member upon recording. This object is also performed by an ink jet recording device which comprises a roller capping member held at a first position retarded from the print head upon recording operation of the print head and at a second position in contact with the end of the print head upon stoppage of the print head after completion of recording operation for being controlled to be rotatable at any time range excluding a time of contact of the member with the print head nozzle outlet and a cleaning member in pressure contact with the surface of the roller capping member when the member is at least rotated.

BRIEF DESCRIPTION OF THE DRAWINGS

FIG. 3 is a schematic view of one preferred embodiment of a capping means employed in the apparatus for capping the nozzle of an ink jet recording device constructed according to this invention;

FIGS. 4A to 4C show examples of arrangements for each operation of the capping means;

DESCRIPTION OF THE PREFERRED EMBODIMENTS

Preferred embodiments of apparatus for capping the nozzle of an ink jet recording device constructed according to this invention for executing the method of capping the nozzle of an ink jet recording device embodying the present invention will now be described with reference to accompanied drawings, but the principle of the method and apparatus of the present invention will first be described with respect to an ink jet recording device employed for performing the present invention.

Figure 1:
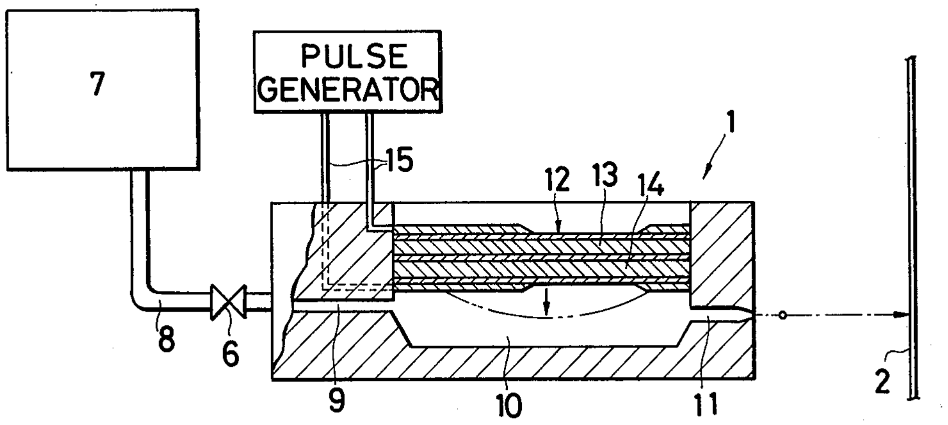
FIG. 1 is a schematic view of the ink jet recording device for ejecting ink droplet toward recording medium employed in the present invention for explanatory purpose.

FIG. 1 shows a schematic view of the ink jet recording device for ejecting an ink droplet toward a recording medium employed in the present invention as a specific example.

Reference numeral 1 generally represents a print head for ejecting an ink droplet to print recording medium 2. Numeral 7 is an ink reservoir containing recording ink therein in communication with the print head 1 by an ink supply passage 8, an automatic control valve 6 provided between the passage 8 and a passage 9 formed in the print head 1 with a pressure chamber 10 formed in the print head 1 from which ink is to be ejected, as will be hereinafter described in greater detail. The print head 1 has a nozzle 11 formed with a negative meniscus by the recording ink from the pressure chamber 10 at the inside end thereof for ejecting the recording ink toward the recording medium 2 by the operation as will be hereinafter described in greater detail. Numeral 12 designates a plate assembly which can deflect toward pressure chamber 10 upon reception of an electric signal from a pulse generator and which is composed of piezoelectric crystals 13 and 14 bonded together.

In operation of the print head 1 thus constructed, when the electric signal from the pulse generator is connected by suitable transmission means such as wires 15 to the print head 1 in a manner that the signal is applied across the crystals 13 and 14, the upper crystal plate 13 contracts and the lower crystal plate 14 expands thereby causing the plate assembly 12 to abruptly flex to the position as designated by two-dotted broken line in FIG. 1. This abrupt decrease in volume will impart sufficient kinetic energy to the ink in the nozzle 11 so that one ink droplet is ejected onto the recording medium 2.

Figure 2:
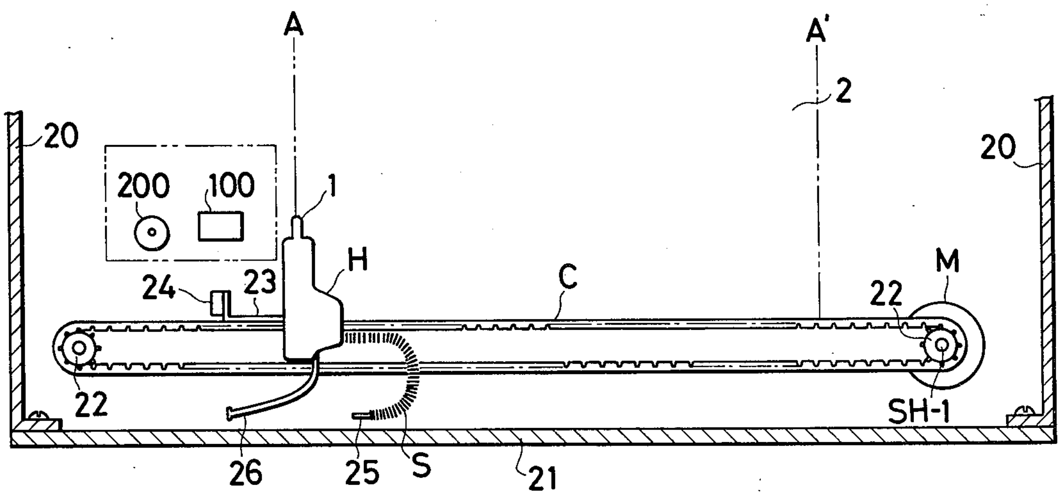
FIG. 2 is a schematic view showing the relationship between the print head and recording medium in the ink jet recording device.

In the meanwhile, the relationship between print head and recording medium is as designated in FIG. 2.

Reference character H represents print head, and the exemplified arrangement of the apparatus shown in FIG. 2 has, for example, seven heads longitudinally arranged but for convenience of simplicity, only one print head is shown in FIG. 2 as designated by numeral 1. Reference numeral 20 represents side plates, and 21 a base plate. Reference character C illustrates a timing belt driven by an appropriate control signal for suitably moving print head 1 and having teeth formed on the inside thereof in engagement at both ends thereof with timing pulleys 22 disposed at both ends. The shaft designated by SH-1 of one timing pulley 22 (disposed, for example, at right side in FIG. 2) is connected to a prime mover such as motor M for reciprocatingly moving the print head 1 in the recording range (corresponding substantially to the width of the recording medium) designated by two-dotted broken lines A and A′ for the moving distance of the head 1. Thus, a desired pattern can be drawn on the recording medium with the composite operations of the movements of the print head 1 with respect to the recording medium 2 and the selective ejection of ink droplet from the nozzle of the print head 1. In the meantime, the leftmost end of the movement of the print head 1 is at the position where a shock absorber 24 provided at the side of an arm 23 extended from the print head 1 comes in contact with left side plate 20. This position is, as clearly seen from FIG. 2, out of the recording range. Reference numeral 25 illustrates a tube (in ink supply passage system) made of flexible material for feeding recording ink into the pressure chamber in the print head from the ink reservoir via the automatic control valve, which tube is arranged with a closely wound spring S therearound. Wires 26 are provided for transmitting an electric signal to cause the pressure chamber in the print head to execute sudden decrease in volume of the pressure chamber. Numerals 100 and 200 designate capping and purging means provided in space (out of the recording range) to be disposed therewith upon no recording to the print head 1.

FIG. 3 shows one preferred embodiment of capping means employed in the apparatus for capping the nozzle of an ink jet recording device of this invention.

Reference numeral 101 generally represents a print head (corresponding to the print head H in FIG. 2) equipped with a plurality of ejection passages 103 such as, for example, those disclosed in U.S. Pat. No. 3,946,398 specification. The ejection passages are stacked in a line perpendicular to the surface of FIG. 3. 101*a* designates a nozzle face of the print head 101. Parallel to the surface of platen 216 around which a recording medium is wound is constructed guide rail 217 for print head 101. The print head 101 can be then shifted to any desired position along guide rail 217 by some appropriate drive means (for example, with a belt-and-pulley combination) either continuously or in an intermittent manner. Limitation blocks 218, 219 (FIG. 4) not only limit the travel of print head 101 but also support guide rail 217. Capping means generally designated by 220 to 228, which will hereinafter be described in greater detail, covers the nozzle of the ink jet recording device for preventing dust from adhering to the nozzle and for eliminating bubbles from generating from the nozzle to prevent the recording ink in the print head from evaporation. Support member 220 is attached to a stationary part of the apparatus and is constructed so as to be able to slide back and forth perpendicularly to the guide rail 217 (up and down in FIG. 3). By spring 221 support member 220 is loaded toward the guide rail 217 (downward in FIG. 3). Suitable cam means 222 causes support member 220 to move back and forth. Rotatable driven gear 223 mounted on support member 220 engages drive gear 224 similarly mounted on support member 220. Drive gear 224 is rotated by a motor (not shown) known per se. The motor is constructed so that when the support member 220 is in its "down" position (contact position), the motor cannot be started due to a safety apparatus which forcibly opens the motor's electric supply circuit. Mounted on top of driven gear 223 is axle 225. Cap or capping member 226 is joined in spline to axle 225 and the surface of its circumference is covered with teflon, rubber or similar substances. Cleaning brush 227, mounted to a stationary part of the apparatus, cleans the surface of the circumference of cap member 226 when the cap member is returned to its "up" position (withdrawn position) and is rotated for a predetermined time under a set operational timing. Scraper blade 228 is mounted upon support member 220 and normally presses against the circumference face of cap member 226 at a determined angle (for example, from 60° to 90°).

Operation of the apparatus thus constructed will now be described in detail. When the device is not in a printing mode, print head 101 moves to the capping position set at the left limitation block. By a suitable detecting means, a signal of the print head's position is then transmitted to capping means 220 to 228. This signal also causes cam means 222 to rotate 180°. Consequently, with this decrease in the amount of cam and the action of spring 221 upon support member 220, the support member 220 moves down (toward the guide rail 217) and the circumferential face of cap member 226 comes into contact with print head nozzle outlet face 101*a.* Capping is now completed and even if the ink in the print head is agitated by heat and vibration, the ink cannot leak out.

For the recording operation, another signal by an appropriate means is transmitted to cam means 222. Once again, the cam means rotates 180°, support member 220 moves up (away from the guide rail 217) to its withdrawal position and contact between cap member 226 and print head nozzle face 101*a* is broken. Then, print head 101 moves freely in front of the platen and the printing operation can now commence.

Moreover, when support member 220 returns to its withdrawal position, an appropriate means detects the completion of the support member's return and by a suitable timing circuit transmits signals to the circuit of the motor. This causes drive gear 224 to rotate and, in turn, driven gear 223 and cap member 226 to rotate (in a counterclockwise direction) for a fixed amount of time. Also at this time a separate motor is engaged and cleaning brush 227 also rotates. By the combination of this brush and scraper blade 228, the circumferential face of cap member 226 is thus cleaned. By setting the time of rotation and the gear ratio properly to yield an odd fraction of revolutions for the cap member, a different part of the cleaned cap member will constantly face the print head nozzle face 101*a* for the next capping operation.

However, this type of recording device is also provided with a means of purging the ink passages of the print head since the intermixing of bubbles and the like with the ink in the ink passages badly influences the preciseness of the printed characters. In this case, since the amount of ink flowing from the print head is rather large during purging, a position away from the printing operation area, i.e., not before the platen, is best to carry out the purging operation. Furthermore, because it is likely that purging will be performed just before the printing operation, the various operations will occur in the following manner: cap separation from the print head, purging and then printing. Thus when considering the capping operation, it is necessary to think about the positions and order in which each operation will be performed with respect to the others.

FIGS. 4A to 4C show examples of arrangements for each operation means. Reference numerals and characters in FIGS. 4A to 4C are in the same manner as those in FIG. 3 except purging means 201 and ribbon-style cap member 226*a.* Reference numeral 201 designates part of a purging means; practically speaking, it is a suction tube which forcibly sucks up all of the ink flowing out of ejection passage 103 during purging. Ribbon-style cap member 226*a,* practically speaking, is constructed such that the ribbon itself is coupled to the movements of support member 220 back and forth and moves in small amounts parallel to guide rail 217. As a whole, the cap member moves back and forth toward print head 101.

The embodiments shown in FIGS. 4A and 4B have both suction tube 201 and cap member 226 (or cap member 226*a*) on one side of the platen (the printing area). The method of operation for FIG. 4A is that the print head 101 remains in position before the cap member when printing is not being performed with the cap member 226 pressed against print head nozzle face 101*a.*

For the purging operation which precedes printing, cap member 226 is withdrawn and print head 101 then shifts to the left edge position before suction tube 201. At this position the suction tube contacts the print head 101 and the purging operation begins. When this ends, print head 101 moves to the area before platen 216 and until printing is completed, the print head moves back and forth in front of the platen. Printing may be performed as the print head moves from left to right as the head returns in the opposite direction, or in both directions. In the present embodiment, the purging position for print head 101 is set against left limitation block 218. This ensures proper contact alignment for suction tube 201 and print head nozzle face 101*a.*

The embodiment shown in FIG. 4B is the same as FIG. 3 except that the positions for the capping and purging operation have been interchanged. In this case, the various positions are arranged to reflect the order in which the operations are to be performed.

In FIG. 4C, the capping means and purging means are arranged on either side of platen 216. Here the printing operation is directly entered into after cap member 226 is withdrawn and the print head normally remains before the platen for printing. When purging of the ink passages become necessary, print head 101 moves against right limitation block 219 when purging is carried out. Naturally, the positions of the capping means and purging means can be interchanged. After cap member 226 is withdrawn, the print head is moved before suction tube 201 for purging and without any capping for one to several days, for example, the printing operation is entered into directly after only purging.

Furthermore, it is possible to unite the operations of the embodiments shown in FIGS. 4A and 4B and printing operation with an operational sequence into a control program. It is also feasible to use such a program for normal times but to append an omission means which can exclude, upon command or not, separate parts of the program in response to necessity.

Figure 5:
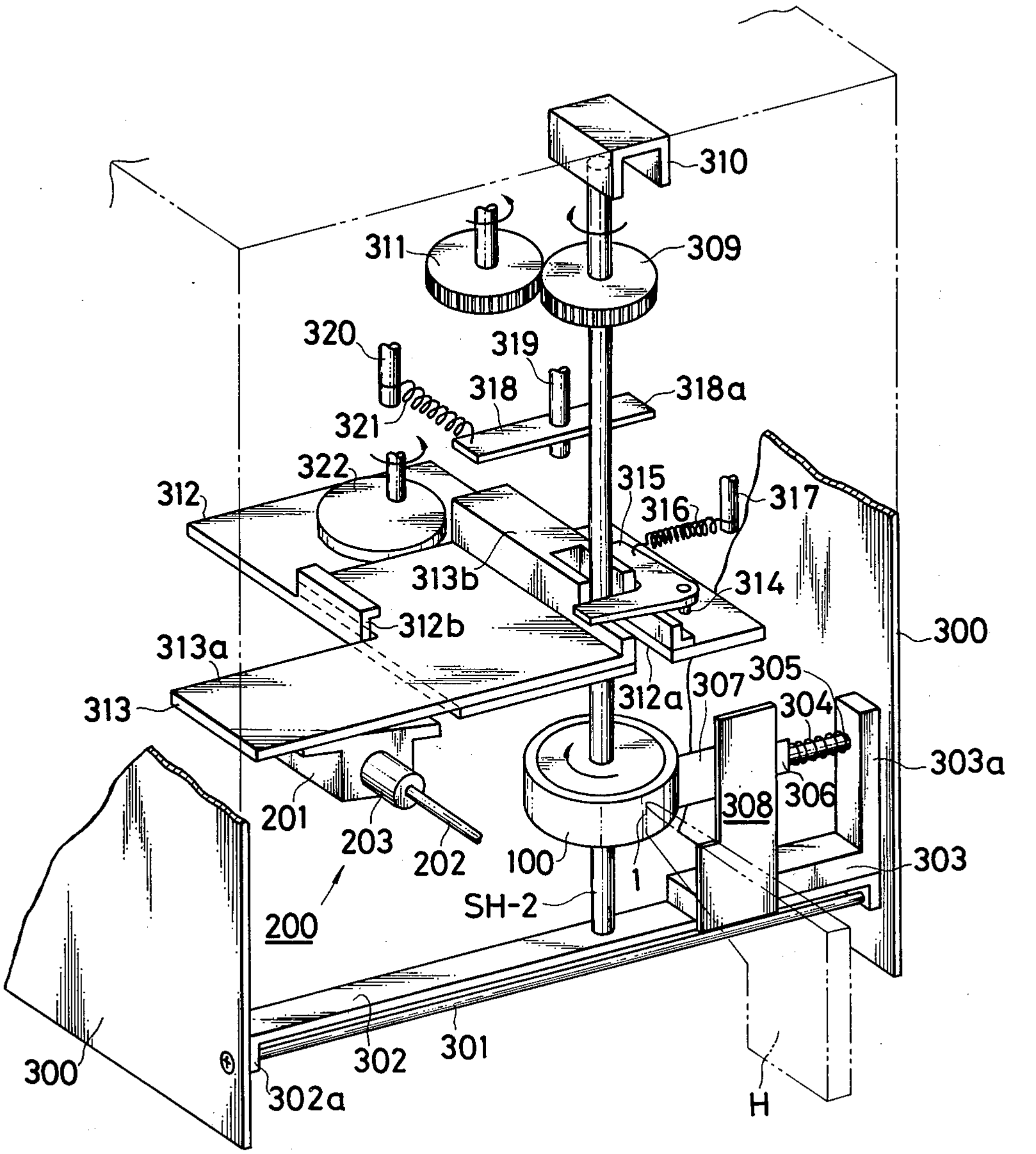
FIG. 5 is a perspective view of concrete arrangement of combination of the capping means in combination with purging means.

FIG. 5 shows concrete arrangement of combination of the capping means designated in FIGS. 3 and 4 of this invention with purging means for eliminating bad influences to the preciseness of the printed characters by purging the passages of the print head caused by the intermixing of bubbles and the like with the ink in the ink passages.

In FIG. 5, reference numeral 300 generally designates a frame for attaching various components of the capping and purging means, which will hereinafter be described in greater detail, composed of right and left side plates and upper plate. Numeral 301 represents a rod secured to the right and left side plates at both ends thereof in a manner rotatable with respect to the side plates, 302 a holder of substantially U shape rockably secured at both sides 302*a* thereof to the rod 301 in small spaces at both side ends from the insides of the right and left side plates of the frame 300. Reference numeral 303 indicates another holder fixedly secured to one end portion of the holder 302 having an arm 303*a* protruded upwardly and formed with a recess on the inside surface thereof for detachably holding a shaft 305 at one end thereof. A spring 304 is arranged around the shaft 305 between a stationary ring 306 fixedly secured onto the other end of the shaft 305 and the arm 303*a* of the holder 303. Accordingly, the shaft 305 is always urged in protruding direction (leftwardly in FIG. 5) by the tension of the spring 304. A scraping blade 307 made of relatively thin rigid material is attached to the end of the shaft 305 passing through the ring 306. Numeral 308 illustrates a stopper fixedly secured to the holder 303 at the base portion thereof in such a manner that the free end thereof is partly in contact with the ring 306 to control the protrusion of the shaft 305 by the spring 304. Reference numeral 100 designates capping member in roller shape having a surface coming into contact with the end of the blade 307 upon completion of assembling of the apparatus.

The capping member 100 is secured on a shaft SH-2 rotatably supported at the holder 302 at one end thereof to rotate in the direction as designated by an arrow upon rotation of the shaft SH-2, as will be hereinafter described in greater detail. This capping member 100 serves to coat the opening or outlet of the nozzle of the print head 1 in operation as has already been described and is covered with teflon, rubber or similar substance as was heretofore described having medicine resistance and wear resistance together with elasticity on metallic core. A gear 309 is fixedly secured to the upper portion of the shaft SH-2 to be driven via a gear 311 engaged therewith by a power transmitted from a prime mover (not shown). The top end of the shaft SH-2 is engaged in the groove of a guide member 310 fixed to upper plate in slidable manner along the groove. These power transmission means may also be composed of suitable elements such as pulley or the like. Reference numeral 312 represents a base plate secured to side plates of frame 300 and having a cutout 312*a* allowing rockable movement of the shaft SH-2 at front side thereof for the guide of the shaft SH-2 and another guide groove 312*b* formed at one side thereof for engaging a slider 313 slidable on the base plate 312 and having an extension 313*a* projected leftwardly of FIG. 5 in engagement with the groove 312*b* of the base plate 312 and raised portion 313*b* protruded therefrom at rightward portion from the center thereof and formed with groove corresponding to a cutout 312*a* of the plate 312 and with stepped portion formed at the front end thereof. A spring (not shown) is disposed in the raised portion 313*b*. Numeral 314 represents a pin standing on the base plate 312 at which L shape lever 315 is rockably secured as shown. One arm of the lever 315 is placed over the stepped portion of the slider 313 on the raised portion 313*b* thereof at the front side of the shaft SH-2 and the other arm of the lever 315 is engaged with a spring 316 at one end thereof and at the other engaged with a fixed pin 317. Numeral 318 designates a lever rotatably secured to a pin 319 suitably fixed in the frame 300 and always urged in one direction by a spring 321 engaged at one end thereof with one end of the lever 318 and at the other with a pin 320 fixed suitably in the frame 300. The lever 318 is so arranged as to always come into contact with the shaft SH-2 at one end 318*a* thereof. The springs 316 and 321 are so controlled as to have tension in a manner that the shaft SH-2 is urged by the lever 318 but may not urge the lever 315. Reference numeral 322 indicates an eccentric cam arranged over the base plate 312 to be rotatable in the direction as designated by an arrow by a power transmitted from the prime mover (not shown) and having maximum eccentric portion kept with equal radius. The circumferential face of the eccentric cam 322 is always in contact with the raised portion of the slider 313 at the rear portion thereof. That is, the rear end of the slider 313 is urged with the circumferential face of the cam 322 by the action of the spring (not shown) arranged in the raised portion 313*b* of the slider 313.

Operation of the apparatus thus constructed of the arrangement as shown in FIG. 5 will now be described in detail.

Assuming that the short diameter portion of the eccentric cam 322 is in contact with the raised portion 313*b* of the slider 313 and that prime mover (not shown) is energized by a control signal, the cam 322 is rotated in the direction as designated by an arrow in FIG. 5 so that the circumferential face of the cam 322 will act to urge the slider 313 forwardly in gradual manner. The gear 311 is still engaged with the gear 309 at this time and the rotation of the gear 311 drives via the gear 309 the shaft SH-2 and accordingly the capping member 100 in the direction as designated by the arrow in FIG. 5. Then, as the slider 313 is moved by the rotation of the cam 322, the shaft SH-2 is rocked to gradually separably engage the gear 309 with the gear 311 to finally separate the gear 309 from the gear 311 to cause the power of the prime mover transmitted to the gear 311 to be disengaged from the gear 309. In this case, the top end of the shaft SH-2 engaged in the guide member 310 rockably moves along the groove of the member 310 and the intermediate portion of the shaft SH-2 is rocked against the tension of the spring 316 via the L shape lever 315 in the cutout 312*a* of the plate 312. Then, immediately before the eccentric cam rotatably reaches maximum eccentric position, the capping member 100 comes into contact with the nozzle of the print head 1 arrived at the position opposite to the member 100 upon completion of the recording operation to thus close the outlet of the nozzle of the print head 1. Accordingly, after the capping member 100 is contacted with the nozzle of the print head 1, the rockable movement of the shaft SH-2 by the subsequent rotation of the eccentric cam and accordingly the movement of the capping member are prevented by the retaining force of the nozzle face of the print head 1.

It will be understood from the foregoing description that even if there are slight irregularities of the capping member, the capping member may sufficiently perform sealing action of the nozzle outlet of the print head by predetermined pressure.

As was heretofore described, the holder 302, shaft SH-2 and capping member 100 integrally arranged are rocked at the lower end of the shaft SH-2 secured to the holder 302 as a flucrum in this state.

Figure 6:
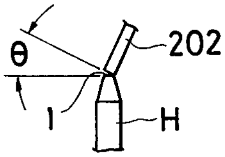
FIG. 6 is a partial view of arrangement of suction tube adjacent to nozzle outlet of print head for the explanatory purpose.

Purging means 200 serves to remove recording ink ejected from the nozzle outlet face of the print head as was described previously. The purging means is composed essentially of support member 201 therefor and slim suction tube 201 which is connected via flexible pipe at the rear end thereof to intake means and treating means (not shown). The support member 201 is then attached at a predetermined angle with respect to the slider 313. The suction tube 202 is so provided as to have substantially the same position as the nozzle outlet of the print head at the lowermost position upon contacting thereof with the nozzle outlet of the head. The relationship of the contact of the nozzle outlet of the print head 1 and the suction tube 202 is as designated from above in FIG. 6. It may be preferable that angle $\theta$ of the nozzle of the print head 1 with respect to the suction tube 202 is in the range of 2° to 30°. It will be clear from this that the movement of the purging means 200 is executed simultaneously upon movement of the capping member 100. Intermediate member 203 arranged between the support member 201 and the suction tube 202 is integrally formed therewith in such a manner that a weak spring (not shown) is provided in the member 201. This spring serves to act as buffer member upon contacting of purging means with the capping member. Thus, when an input signal is, for example, applied to a motor M shown in FIG. 2 via a main switch (not shown), the prime mover for driving the capping member is simultaneously energized so that the capping member 100 is separated from the contacting position therebetween with the nozzle outlet of the print head (purging means 200 is moved in the same manner as the capping member 100). On the midway the gear 309 secured to the shaft SH-2 comes into contact with the gear 311 to cause the capping member secured to the shaft SH-2 to be driven together via the gear 309.

Blade 307 is always urged in contact with the surface of the capping member 100 for excluding recording ink adhered onto the surface of the member 10. In the meantime, print head 1 ejects suitable amount of ink from the nozzle outlet in advance to the start of the recording operation. When the slider 313 once retarded backwardly is again moved forwardly, print head 1 is disposed to the position where shock absorber 24 provided at the side of the arm 23 comes into contact with the side plate 20, i.e., where the relationship between the suction tube 202 forming the purging means at the end thereof and the nozzle outlet of print head 1 maintains the relation as designated in FIG. 2. Immediately before the purging means comes into contact with the nozzle face of print head, the intake means (not shown) will actuate to generate air stream in the tube including the nozzle outlet of print head. This air stream thus generated intakes small amount of ink from the nozzle outlet at the lowermost position and simultaneously introduce other recording ink contaminating the nozzle face of the print head into treating means. Upon completion of purging action thus executed the slider 313 will again be retarded backwardly and print head will simultaneously move rightwardly of FIG. 2 to thus reach the starting position of recording (for example, left side position designated by two-dotted broken line in FIG. 1) with the resultant waiting for signal of recording operation. Upon completion of recording operation the print head returns to the position where can contact with the capping member 10 to seal the nozzle outlet of the print head as previously described.

Then, the aforementioned operations are repeated subsequently. Print head used for experiment had the following configurations:

Diameter of nozzle outlet: 75 microns
Interval of nozzles: 350 microns
Intake force of intake means: 30 cc/sec.

It was investigated that about five seconds were took for sufficient purging. Since the diameter of the suction tube was constructed larger than the diameter of the nozzle outlet of print head, the suction tube was partly disposed at the lowermost position of the nozzle outlet of the print head.

It should be understood from the foregoing description that since the method and apparatus of this invention is thus constructed and operated, it can prevent dust from adhering to the nozzle of print head upon no recording operation thereof and can also prevent bubbles from generating from the nozzle face of the print head so as to always normally record on a recording medium.

What is claimed is:

1. A method of capping a nozzle in a face of a printing head of an ink jet recording apparatus in which ink droplets are ejected to a recording medium from the nozzle communicating with a fluid chamber by suddenly reducing the volume of fluid in said chamber responsive to electrical control signals, which comprises the steps of:

(a) providing a capping means having a capping surface larger in area than the nozzle of the head at a position outside said recording medium;

(b) moving said printing head to the position where said capping means is provided when recording is not performed;

(c) positioning the capping surface relative to said head face to provide a different portion in position for contacting the nozzle from that which was used in the last capping operation; and (d) bringing said capping means and the nozzle of said printing head into contact with each other to thereby cap the nozzle of said printing head.

2. A method as defined by claim 1, wherein said capping means is advanced from the retarded position to contact with the nozzle of said printing head under a predetermined pressure when recording is not performed.

3. A method as defined by claim 1, wherein said capping means is in the form of a roller of which surface is made of non-hygroscopic elastic material.

4. A method as defined by claim 3, wherein a cleaning means is provided in a manner to be held in contact with the surface of said capping means under a predetermined pressure for cleaning the surface of said capping means as said capping means rotates when the nozzle of said printing head and said capping means are not held in contact with each other.

5. A method as defined by claim 4, wherein a cleaning means is provided in a manner to be held in contact with the surface of said capping means under a predetermined pressure for cleaning the surface of said capping means as said capping means rotates when the nozzle of said printing head and said capping means are not held in contact with each other.

6. A method as defined by claim 1, wherein said capping mean is in the form of a tape made of non-hygroscopic elastic material.

7. Apparatus for capping the nozzle of a print head of an ink jet recording device for ejecting ink droplets upon a recording medium from the nozzle communicating with pressure chamber formed in the print head by the sudden decrease in volume of the pressure chamber responsive to control signal, which comprises:

a supporting member attached to a stationary part thereof in a manner slidable to the print head via spring;

cam means for causing said support member to move back and forth;

driven gear rotatably mounted on said support member;

drive gear engaged with said driven gear for driving said driven gear by a prime mover;

an axle rotatably mounted thereto for mounting said driven gear on top thereof; and capping member joined in spline to said axle for covering the nozzle of the print head.

8. Apparatus as defined in claim 7, further comprising cleaning brush mounted to a stationary part thereof for cleaning the surface of the circumference face of said capping member.

9. Apparatus as defined in claim 7, further comprising scraper blade mounted upon said support member for normally pressing against the circumference face of said capping member at a determined angle such as from 60° to 90°.

10. Apparatus as defined in claim 7, further comprising:

a guide member fixed to stationary part thereof for slidably engaging the top of said axle in rockable manner;

a base plate secured to stationary part thereof having a cutout allowing rockable movement of said axle at front side thereof for the guide of the axle and another guide groove formed at one side thereof;

a slider slidably engaged with said base plate at the groove of the plate having an extension projected laterally in engagement with the groove of said base plate and raised portion protruded therefrom at side portion from the center thereof and formed with groove corresponding to the cutout of said plate and with stepped portion formed at the front end thereof;

a lever of L shape rockably secured onto said base plate at the intermediate portion thereof in a manner that one arm thereof is placed over the stepped portion of said slider on the raised portion thereof at the front side of said axle and the other arm thereof is engaged resiliently with the stationary part thereof;

another lever rotatably secured to the stationary part thereof always resiliently urged in one direction at one end thereof for always contacting with said axle; and an eccentric cam arranged over said base plate rotatable in one direction having maximum eccentric portion kept with equal radius in a manner always in contact with the raised portion of said slider at the rear portion thereof.

11. In an ink jet recorder having an ink jet recording head with at least one nozzle in its face through which droplets of ink are discharged against a recording medium, means being provided for giving relative motion between said head and said recording medium, a capping system, comprising:

a capping surface larger than the print head face and held at a capping position adjacent to but outside of said recording area, means for moving the head and capping surface together and apart when said head is positioned opposite said capping surface, and means for moving the capping surface relative to the capping position when said head is not urged against it so that a different area of said capping surface caps said nozzle in one capping operation that is different from the area used in a previous capping operation.

12. The capping system for an ink jet recorder as defined by claim 11 which additionally comprises means for cleaning said capping surface in a manner that once a given area of said surface has been utilized to cap said nozzle, it is not again used for capping the nozzle until mechanically cleaned.

13. In the capping system for an ink jet recorder as defined by claim 12 wherein said cleaning means is held in contact with said capping surface under sufficient pressure for cleaning the surface as it is moved by said moving means.

14. The capping system for an ink jet recorder as defined by claim 11 wherein said means for moving the head and capping surface together and apart operates only while said head is at rest.

15. A method of capping a nozzle in a face of a printing head of an ink jet recording apparatus in which ink droplets are ejected to a recording medium from the print head while lateral relative motion is provided between the print head and the recording medium to cause printing to take place, comprising the steps of:

providing a capping means having a capping surface larger in area than the nozzle of the head at a position outside said recording medium, moving said printing head to a position opposite said capping means at a time when printing is not performed, positioning the capping surface relative to said head face to provide a different portion in position for contacting the nozzle from that which was used in the last capping operation, and bringing said capping means and the nozzle of said printing head into contact with each other without lateral motion therebetween, thereby to cap the nozzle of said printing head.

16. The method of claim 15 wherein the step of positioning the capping surface includes cleaning a portion of said surface simultaneously with said positioning.

* * * * *